United States Patent

Ness et al.

[11] Patent Number: 5,853,028
[45] Date of Patent: Dec. 29, 1998

[54] VARIABLE FORCE SOLENOID OPERATED VALVE ASSEMBLY WITH DAMPENER

[75] Inventors: John A. Ness, Birmingham; Robert A. Dayton, Attica, both of Mich.

[73] Assignee: Eaton Corporation, Cleveland, Ohio

[21] Appl. No.: 846,402

[22] Filed: Apr. 30, 1997

[51] Int. Cl.$^6$ .................................................. F15B 13/044
[52] U.S. Cl. ................ 137/625.65; 251/50; 251/129.18; 335/237
[58] Field of Search ........................ 137/625.65; 251/50, 251/129.18; 335/237

[56] References Cited

U.S. PATENT DOCUMENTS

| | | | |
|---|---|---|---|
| 4,610,428 | 9/1986 | Fox ........................................ | 335/237 X |
| 4,643,225 | 2/1987 | Imhof ............................... | 137/625.65 X |
| 4,669,504 | 6/1987 | Fujitsugu et al. .................... | 137/625.65 |
| 4,947,893 | 8/1990 | Miller et al. ........................ | 137/625.65 |
| 5,191,827 | 3/1993 | Kervagoret ...................... | 137/625.65 X |
| 5,513,673 | 5/1996 | Slavin et al. ........................ | 137/625.65 |
| 5,571,248 | 11/1996 | Seetharaman et al. ............ | 137/625.65 |
| 5,577,534 | 11/1996 | Ward ............................... | 137/625.65 X |

FOREIGN PATENT DOCUMENTS 61-244982  10/1986   Japan ................................. 137/625.65

*Primary Examiner*—Gerald A. Michalsky
*Attorney, Agent, or Firm*—Roger A. Johnston

[57] ABSTRACT

A variable force solenoid operated pressure control valve of the type having a force balanced spool moveably controlled energization of the solenoid for modulating the discharge pressure of the valve at its control outlet when the valve is supplied at its inlet with fluid of a supply pressure. The spool is moved to bleed fluid through an exhaust port to a sump for controlling the pressure supplied to the control outlet. The spool has a dashpot and piston in one end for providing hydraulic dampening of spool oscillations. In one embodiment a cylindrical piston is used and in an alternate arrangement a ball is employed in the dashpot.

5 Claims, 2 Drawing Sheets

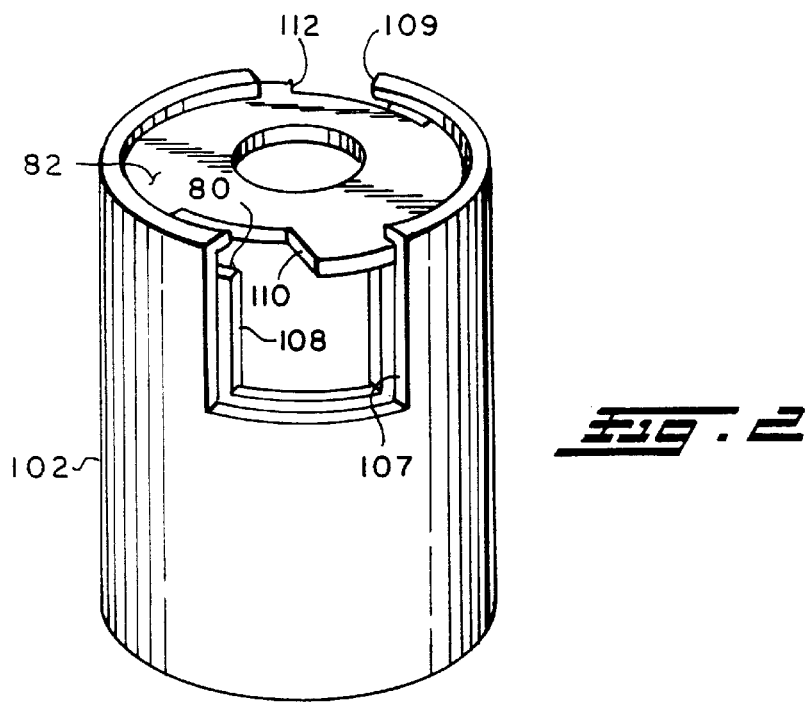
Fig. 2
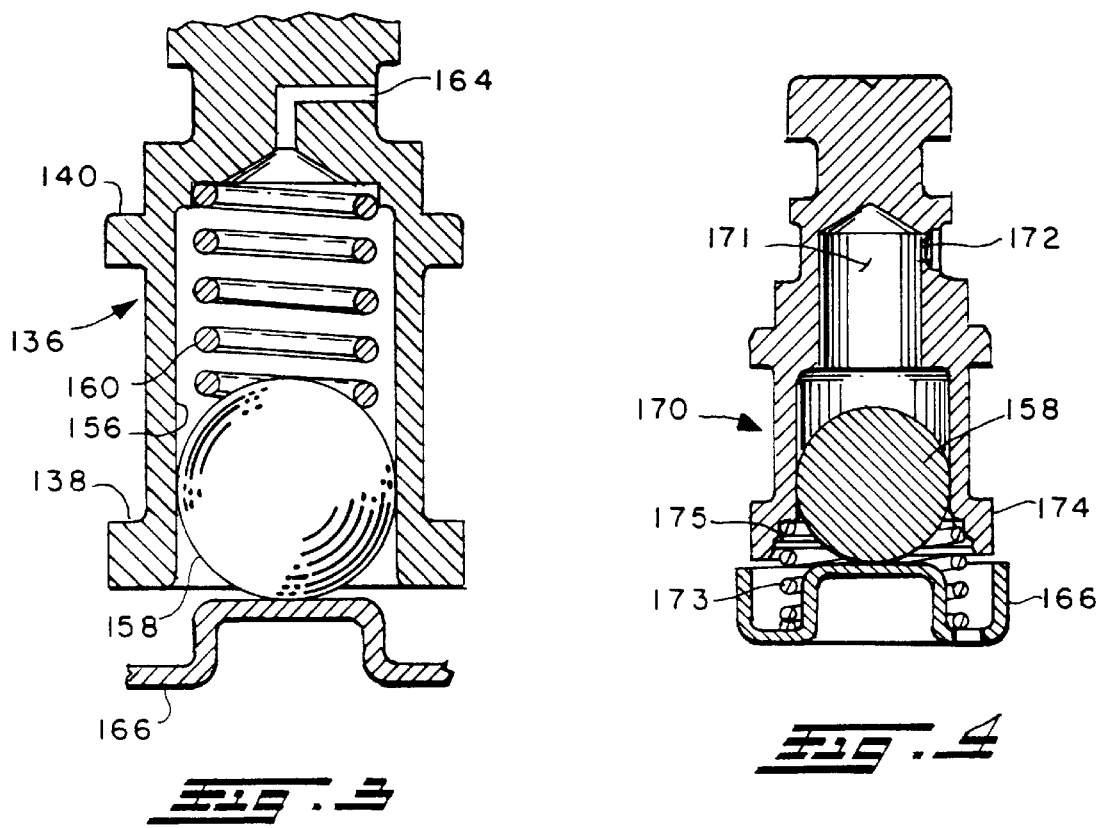
Fig. 3
Fig. 4

VARIABLE FORCE SOLENOID OPERATED VALVE ASSEMBLY WITH DAMPENER

CROSS-REFERENCE TO RELATED APPLICATIONS

Not applicable

STATEMENT REGARDING FEDERALLY SPONSORED RESEARCH OR DEVELOPMENT

Not applicable

MICROFICHE APPENDIX

Not applicable

BACKGROUND OF THE INVENTION

The present invention relates to an electrically modulated pressure control valve actuated with a variable force solenoid.

Valves of this type are typically controlled by an electrical signal providing variable voltage or controlled current to provide an increasing or decreasing magnetic force on an armature for effecting movement of a valve member. Valves of this type have found particular application in automatic transmissions for motor vehicles to permit electrical control of the fluid pressure for effecting gear shifting in the transmission.

In automotive transmission control applications, the solenoid operated valve is typically configured to control the pressure drop between a supply pressure at the valve inlet and the pressure provided at a control outlet by controlling the return flow to an exhaust connected to the system return or sump. In such valve applications for automatic transmission control, the valve is typically arranged to either increase or decrease the pressure to the control outlet with increasing or decreasing current flow to the solenoid.

Solenoid operated pressure control valves typically employ a force balanced spool having lands formed thereon and which is axially moved to vary the restriction of flow between axially spaced inlet, outlet and exhaust ports or passages in the valve body. Examples of such known solenoid operated pressure control valves employed for motor vehicle automatic transmission fluid pressure control are shown and described in U.S. Pat. No. 4,947,893 issued to Miller, et al. and U.S. Pat. No. 5,513,673 issued to Slavin, et al.

In field service, such known solenoid operated pressure control valves in automatic transmission applications have experienced problems with oscillation of the spool and self-excited vibration from changes in the pressure forces acting on the spool causing transient force imbalance. This oscillations of the spool affect the response of the valve to controlled changes in the electrical control signal to the solenoid and also make the variable force solenoid valve unstable and quite difficult to calibrate.

Therefore, it has been desired to find a way or means of improving a variable force solenoid operated hydraulic pressure control valve of the balanced spool type and to provide such a valve which experiences a minimum of oscillations and instability when connected in an hydraulic circuit for pressure control duty therein.

BRIEF SUMMARY OF THE INVENTION

The present invention provides an improved variable force solenoid operated spool type pressure control valve assembly for regulating the outlet control pressure by the solenoid armature effecting axial movement of the spool valve member.

It is an object of the present invention to provide a variable force solenoid operated hydraulic pressure control valve which is dampened to minimize the effects of oscillations and vibrations, particularly such oscillations and vibrations which are tended to be self-induced.

It is a further object of the present invention to provide a variable force solenoid operated pressure control valve utilizing a pressure balanced spool which is hydraulically dampened.

The present invention is arranged such that the spool has three lands disposed therealong and is moveable in a bore in the valve body for controlling the pressure drop between the inlet and control outlet and between the control outlet and the exhaust to sump. The spool is arranged for pressure force balancing axially thereon and has a hydraulic damping means provided in the form of metered flow from a dashpot to dampen oscillations of the spool. In the preferred arrangement of the valve assembly, the spool has a blind bore formed in one end with a closely fitted piston therein; and, the bore is connected by a metering orifice to the chamber communicating with the control outlet and exhaust passages. In one embodiment the piston is cylindrical and in another embodiment the piston comprises a ball.

The present invention thus provides an improved solenoid operated balanced spool type pressure control valve responding to a modulated electrical signal for varying the magnetic force on the solenoid armature for effecting movement of the spool to control the outlet pressure of the valve and employs hydraulic dashpot dampening of the spool.

BRIEF DESCRIPTION OF THE DRAWINGS

FIG. 2 is an axonometric view of the solenoid housing cannister illustrating the magnetic flux adjustment features;

FIG. 3 is a partial view similar to FIG. 1 showing an alternative embodiment of the hydraulic dampening mechanism; and, FIG. 4 is a further alternative embodiment.

DETAILED DESCRIPTION OF THE INVENTION

Figure 1:
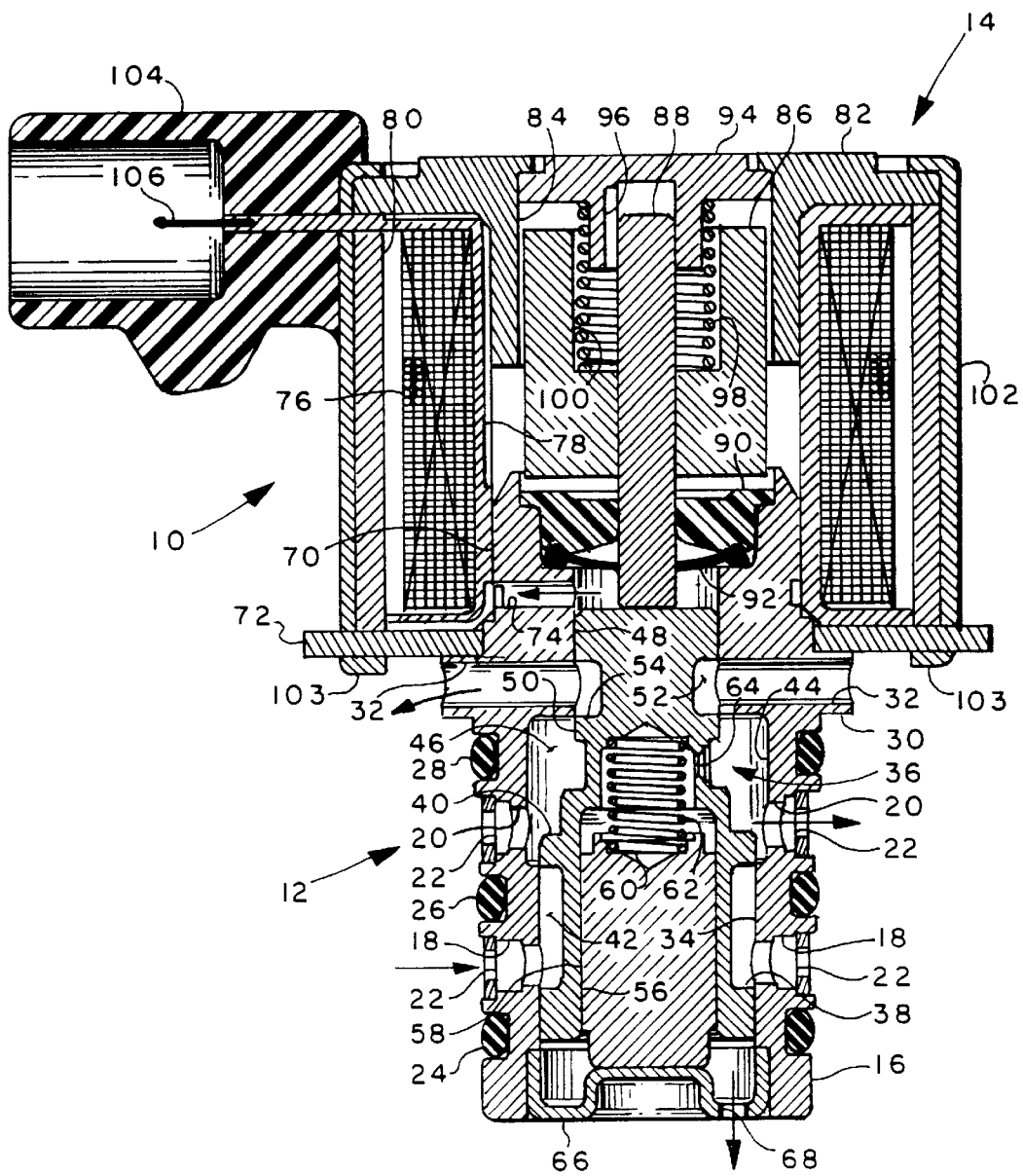
FIG. 1 is a cross-section taken through the variable force solenoid operated valve of the present invention.

Referring to FIG. 1, the variable force solenoid operated pressure control valve assembly is indicated generally at 10 and includes a body assembly indicated generally at 12 and a solenoid assembly indicated generally at 14 which are attached together to form an operative valve assembly.

The body 12 has a generally cylindrical lower portion 16 which has formed therein a plurality of circumferentially spaced inlet ports 18 disposed thereon at a common axial station and which are adapted for connection to a source of fluid pressure (not shown) at an operating inlet pressure, which for a typical automotive transmission application is in the range 100–250 PSIG (690–1725 kPa).

A second plurality of circumferentially spaced ports 20 are disposed at a common axial location spaced from inlet ports 18; and, ports 20 comprise outlet ports for a controlled pressure of fluid to be supplied to ports or passages (not shown) in the system to be controlled. Each of the ports 18, 20 preferably has a filter screen 22 provided therein and retained by a resilient seal ring about the periphery of each of the screens 22. Typically ports 18, 20 are isolated from each other and from the surrounding portions (not shown) of the system by suitable resilient seal rings denoted by reference numerals 24, 26, 28 provided in corresponding annular grooves formed in the periphery of the body 16.

An enlarged diameter flange portion 30 is formed on body 12 above the seal ring 28 and flange 30 has formed therein a plurality of circumferentially spaced exhaust ports 32 disposed at a common axial location thereon. Ports 32 are intended to be connected to the sump or pump return (not shown) of the system providing the inlet pressure to ports 18.

Body 12 has a valving bore 34 formed therein in which is slidably received therein in precision closely fitting arrangement a spool indicated generally at 36. Spool 36 has a first annular land 38 formed on the lower end thereof and a second annular land 40 formed in axially spaced arrangement with land 38; and, land 40 is located adjacent the upper end of bore 34 and forms an annular chamber 42 in cooperation with bore 34 and land 22, which chamber 42 is in open communication with inlet ports 18.

Bore 34 is relieved to an enlarged diameter 44 at its upper end which diameter 44 is in open communication with the control outlet ports 20. The relief of diameter 44 forms an annular chamber 46 which has a second precision bore 48 formed in the upper end thereof, Bore 48 has slidably received therein, in precision closely fitting arrangement a stepped down or reduced diameter portion 50 formed on the spool 36. The portion of the spool having diameter 50 has an annular groove 52 formed therein which groove communicates openly with exhaust ports 32; and, groove 52 defines an annular land 54 formed on the diameter 50 portion of the spool. Land 50 is located axially on the spool so as to control communication between chamber 46 and the groove 52 and thus controls bleed flow from chamber 46 to exhaust ports 32.

Spool 36 has a central axial blind bore 56 formed in the lower end thereof which bore has slidably received therein, in precision closely fitting arrangement, a piston 58 which is biased downwardly by a compression spring 60 which has one end registered against the upper end of piston 58 with the opposite end of the spring registered against the blind end of bore 56. The space between the upper end of piston 58 and the blind end of bore 56 comprises a dashpot chamber, denoted by reference numeral 62, and which is ported to chamber 46 by a metering port or orifice 64 formed radially in spool 36. In the presently preferred practice of the invention, the metering orifice 64 has a diameter of 0.030 inches (0.76 mm) to thus provide substantially restricted or metered flow between dashpot chamber 62 and chamber 46.

The piston 58 and spool 36 are retained in the body bore 34 by a Welsh plug 66 pressed into a slight counter bore formed in the lower end of bore 34, and, the lower end of the spool 36 and piston 58 are vented to the sump or the atmosphere through an orifice 68 formed in plug 66.

Body 12 includes reduced diameter upper portion 70 which has bore 48 formed therein which has the reduced diameter portion 50 of the spool slidably received therein. The body bore 48 is vented to the sump or atmosphere by a crossport 74.

The upper portion 70 of the body has the solenoid assembly 14 attached thereto by means of a flux collector plate 72 having a generally annular configuration received over the upper portion 70 in press-fitted arrangement and registered against the upper surface of body flange 30.

Solenoid assembly 14 further includes a coil 76 wound on bobbin 78. A generally cylindrical tubular spacer 80 is disposed over the bobbin 78 and has registered on the upper end thereof an annular flux collector ring 82 which has a downwardly extending axial central hub portion 84 which has slidably received therein an armature 86. The lower end of armature 86 defines a working air gap with the upper end of body portion 70.

Armature 86 has a pin or actuating rod 88 press fitted centrally therethrough and extending downwardly therefrom to contact the upper end of spool 36. A non-magnetic bearing spacer 90 is received in the upper end of body portion 70 and serves to maintain a minimum air gap between the lower end of armature 86 and the upper end of the body portion 70. The bearing spacer 90 locates the lower end of pin 88 centrally in bore 48. Diaphragm 92 provides a fluid pressure seal about the pin 88 and the upper end of bore 48 in body portion 70.

A bearing 94 is positioned in the central region of flux collector ring 82; and, bearing 94 has a downwardly extending projection 96 which has slidably received therein the upper end of pin 88. The hub portion 96 of bearing 94 has received thereover the upper end of a coil spring 98 which has its lower end registered in a counterbore 100 formed in the upper end of armature 86. Spring 98 thus biases the armature 86 and pin 88 downward to maintain the lower end of the pin 88 in contact with the upper end of spool 36.

The bobbin 78, coil 76, spacer 80, flux collector ring 82 and bearing 94 are retained on collector ring 72 by a cylindrical shell 102 which has the upper end thereof crimped over the outer periphery of flux collector 82 and tabs 103 provided on the lower end of shell 102 crimping over the undersurface of flux collector ring 72. The outer shell has provided thereon a receptacle 104 which has provided therein an electrical terminal 106 which is electrically connected to the coil 76 and is adapted for external electrical connection thereto by a suitable connector (not shown).

Referring to FIG. 2, a feature of the construction of the valve assembly 10 of FIG. 1 is illustrated wherein the spacer 80 has at least one notch 108 but preferably two formed in the upper end thereof, and, the outer shell 102 has correspondingly located notches 107, 109 formed therein. The flux collector plate 82 has at least one and preferably two oppositely disposed notches 110, 112 formed therein. The flux collector ring 82 may be rotated in the spacer 80 to align or misalign the flux collector notches 110, 112 with the notch 108 in spacer 80 to vary the flux strength between the collector 82 and spacer 80 for adjusting the magnetic operation of the solenoid assembly 14.

Referring to FIG. 3, an alternate arrangement of the spool is shown generally at 136, wherein the dashpot blind bore 156 has a ball 158 slidably received therein with metering orifice 164 supporting bore 156 and retained by plug 166. Spring 160 has its upper end registered against the blind end of bore 156 and its lower end registered on the ball and biases spool 136 upward similar to the function of spring 60 of FIG. 1.

Referring to FIG. 4 an alternate of the spool is shown generally at 170, where the dashpot blind bore 171 has a ball 158 slidably received therein with metering orifice 172 supplying bore 171 and retained by plug 166. Spring 173 has its upper end registered against a counterbore 175 in the bottom of spool 174 and its lower end registered on the plug 166 and biases spool 174 upward similar to the function of spring 60 of FIG. 1.

In operation, fluid entering ports 18 at inlet line pressure is metered or has the pressure thereof dropped across the annular space between land 40 and bore 34 by an amount dependent upon the position of the spool 36. In the present practice of the invention, with the coil de-energized land 40 is spaced a very small amount from the upper end of bore 34 and permits relatively unrestricted fluid pressure flow into chamber 46 and to control outlet ports 20. The pressure in chamber 46 is determined by the pressure drop in the annular space between land 54 and bore 48 which controls flow to groove 52 and out exhaust port 32. In the present practice of the invention, with the coil de-energized land 54 overlaps the lower end of bore 48 and the restriction caused thereby maintains the pressure in chamber 46 at a pressure proportional to spring 60 load.

As coil 14 is energized, increasing current flow in the coil causes armature 86 to overcome the pressure forces and the force of spring 60 and move the spool 36 downwardly to progressively increase the restriction between land 40 and bore 34 and decrease the restriction between land 54 and bore 48 to thereby permit greater flow to the exhaust and lower the pressure in chamber 46 and thus provide a lower pressure to control outlet ports 20.

In the presently preferred practice of the invention, the diameters of the stepped spool are chosen such that the annular area defined by the differences between the area encompassed at diameter 50 and the area encompassed at diameter of the land 40 comprise the effective area acted upon by pressure forces in chamber 46 and thus determines the force acting downwardly on spool 36. The forces acting upwardly on spool 36 comprise the force of spring 60 added to the pressure forces of the pressure in chamber 62 acting over the area of the bore 56. Although spring 98 urges the armature and pin 88 downwardly against the spool 36, spring 98 is chosen such that the force of the spring 98 is considered negligible with respect to the force of spring 60. With the downward pressure forces on spool 36 balanced by spring 60, as the solenoid current is increased and a greater magnetic force applied downwardly to armature 86, and pin 88 is readily able to move the spool 36 downwardly.

Calibration of the variable force solenoid operated valve of the present invention is accomplished by pressurizing the inlet ports 18 at the intended supply pressure and applying a force with an external tool (not shown) axially against the welsh plug 66 sufficient to deform the plug center portion, which acts as a stop for the end of piston 58, to thereby vary the preload of spring 60 on the spool and move the spool in an upward direction to the desired position against the downward pressure forces due to the pressure in chamber 46.

As described above, the magnetic force of the solenoid, for a given current flow may be adjusted. The magnetic force is increased by rotating the flux collector 82 with respect to spacer 80 to align slots 110, 112 with slots 108, or may be decreased by rotating the flux collector 82 to a position where the notches 110, 112 are misaligned with the slots 108.

The present invention thus provides an improved and cost efficient design for a variable force solenoid operated pressure control valve in which the magnetic force of the solenoid may be adjusted by rotating the upper flux collector plate disposed over the coil; and, the hydraulic adjustment or calibration of the spool is accomplished by deforming a stop for a dashpot piston in the end of the spool to vary the preload of the spool bias spring. The piston and dashpot in the end of the spool provides hydraulic dampening of the spurious oscillations in the spool during changes in spool position as the solenoid is energized for providing control of the outlet pressure of the valve to the system to be controlled.

Although the present invention has hereinabove been described with respect to the illustrated embodiments, it will be understood that the invention is capable of modification and variation and is limited only by the following claims.

We claim:

1. A variable force solenoid operated valve assembly for providing a control pressure at an outlet from an inlet supply pressure in response to an electrical signal to the solenoid comprising:

(a) a valve body having an inlet passage adapted for connection to a fluid source at supply pressure, an outlet passage supplying fluid at a control pressure adapted for communication with a system to be controlled, an exhaust passage adapted for connection to a sump, and a valving bore communicating with each of said passages in axially spaced arrangement;

(b) a spool valve moveably disposed in said valving bore and having a first annular land defining a first chamber communicating with said inlet passage, a second annular land defining a second chamber communicating with said outlet passage and a third annular land stepped from said second land defining a third chamber communicating with said exhaust passage, said spool having a blind bore formed in an end thereof with a piston moveably received therein in closely fitting arrangement including means biasing said piston outwardly of said blind bore, said spool including a port communicating said blind bore with said second chamber;

(c) a first restriction means associated with said second annular land for controllably restricting fluid communication between said first chamber and said second chamber;

(d) a second restriction means associated with said third annular land for controllably restricting fluid communication between said second chamber and said third chamber; and, (e) a solenoid assembly including a coil, an armature and a flux collector for providing a flux loop about said coil spaced from said armature, said armature operably contacting said spool valve for effecting movement thereof in response to controlled energization of said coil, and means biasing said armature in a direction away from said flux collector; and, (f) a stop for limiting said outward movement of said piston, whereby controlled energization of said solenoid coil effects movement of said armature and movement of said spool valve in a direction to cause said first restriction to decrease fluid communication between said first and second chamber and cause said second restriction to increase communication between said second and third chambers with said piston closely fitted in said blind bore such that said piston and blind bore function as a dashpot for dampening transient movement of said spool.

2. The valve assembly defined in claim 1, wherein said flux collector is adjustable for varying said air gap.

3. The valve assembly defined in claim 1, wherein said spool port comprises a metering orifice.

4. The valve assembly defined in claim 1, wherein said spool valve is vented to sump at opposite ends.

5. The valve assembly defined in claim 1, wherein said flux collector includes a generally tubular member having at least one void therein and a plug member having at least one recess therein received in said tubular member, said plug rotatable for varying the orientation of said recess to said void for varying the flux across said air gap.

* * * * *